(12) United States Patent
Brewer et al.

(10) Patent No.: US 9,278,756 B2
(45) Date of Patent: Mar. 8, 2016

(54) DRY LUBRICATED LINEAR ACTUATOR FOR IN BLADE ROTOR CONTROL

(75) Inventors: Paul R. Brewer, Bristol (GB); Reg R. Raval, North Somerset (GB); Suat Bekircan, Bath (GB)

(73) Assignee: CLAVERHAM LTD (GB)

( * ) Notice: Subject to any disclaimer, the term of this patent is extended or adjusted under 35 U.S.C. 154(b) by 807 days.

(21) Appl. No.: 13/599,843

(22) Filed: Aug. 30, 2012

(65) Prior Publication Data
US 2013/0336787 A1 Dec. 19, 2013

(30) Foreign Application Priority Data

Jun. 13, 2012 (EP) ..................... 12171794

(51) Int. Cl.
*B64C 27/615* (2006.01)
*B64C 27/72* (2006.01)
*B64C 27/00* (2006.01)
*F16H 25/24* (2006.01)

(52) U.S. Cl.
CPC .............. *B64C 27/615* (2013.01); *B64C 27/00* (2013.01); *B64C 27/72* (2013.01); *B64C 2027/7272* (2013.01); *F16H 2025/249* (2013.01); *Y02T 50/34* (2013.01)

(58) Field of Classification Search
CPC ..................................................... B64C 27/615
See application file for complete search history.

(56) References Cited

U.S. PATENT DOCUMENTS

| 3,643,522 | A | 2/1972 | Fullam |
| 6,007,286 | A | 12/1999 | Toyota et al. |
| 6,827,310 | B1 * | 12/2004 | Whitham ..................... 244/3.24 |
| 2008/0101931 | A1 * | 5/2008 | Chaudhry et al. ............ 416/131 |
| 2008/0138203 | A1 | 6/2008 | Collins et al. |
| 2010/0269616 | A1 | 10/2010 | Merlet et al. |

FOREIGN PATENT DOCUMENTS

| EP | 0371213 A1 | 6/1990 |
| EP | 2341259 A2 | 7/2011 |
| RU | 62568 U1 | 4/2007 |

* cited by examiner

*Primary Examiner* — Richard Edgar
(74) *Attorney, Agent, or Firm* — Cantor Colburn LLP

(57) ABSTRACT

A rotor blade assembly includes a rotor blade and a rotatable flap portion located along a span of the rotor blade. A linear actuator located inside the rotor blade is operably connected to the flap portion to rotate the flap portion about a flap axis and is absent oil, grease or other fluid lubricant. A rotary-winged aircraft includes an airframe and a main rotor assembly operably connected to the airframe. The main rotor assembly includes a plurality of rotor blade assemblies rotatable about a rotor assembly axis. At least one rotor blade assembly of the plurality of rotor blade assemblies includes a rotor blade and a rotatable flap portion located along a span of the rotor blade. A linear actuator positioned inside the rotor blade is operably connected to the flap portion to rotate the flap portion about a flap axis and is absent oil, grease or other fluid lubricant.

13 Claims, 3 Drawing Sheets

DRY LUBRICATED LINEAR ACTUATOR FOR IN BLADE ROTOR CONTROL

BACKGROUND OF THE INVENTION

The subject matter disclosed herein relates to rotary-winged aircraft. More specifically, the subject matter disclosed herein relates to actuation of control surfaces of rotary-winged aircraft rotor blades.

Rotary-winged aircraft, such as helicopters, often utilize movable surfaces such as flaps on the blades of the main rotor of the helicopter. Movement of these flaps, such as rotation of the flaps about an axis, improves performance of the rotor in certain flight conditions. Typically, the flaps are moved via linear actuators either directly connected to the flap (chordwise) or operating through a bell crank mechanism (spanwise). The linear actuators are most often constructed using ball screws or roller screws driven by brushless DC motors. To convert the linear motion of the actuator into the desired rotary motion of the flap, it is necessary to connect the actuator to the flap via mechanical linkages and/or bell cranks. The linear actuator components such as motor bearings, roller-screw, and sliding parts such as the output shaft are lubricated by oil or grease contained in the actuator to reduce friction. Such lubricants are affected by high centrifugal forces and tend to migrate to a radially outboard end of the actuator, leaving portions of the actuator without adequate lubrication. Grease and oil are also affected by operating temperature, with low temperatures causing the lubricant to thicken, resulting in sluggish operation. Also, in a linear actuator the internal volume of the actuator changes during operation, so a complete oil fill of the actuator is not a practical solution, and a partial oil fill may be subject to leakage during operation.

BRIEF DESCRIPTION OF THE INVENTION

In one embodiment, a rotor blade assembly includes a rotor blade and a rotatable flap portion located along a span of the rotor blade. A linear actuator is located inside the rotor blade and is operably connected to the flap portion to rotate the flap portion about a flap axis. The linear actuator is absent oil, grease or other fluid lubricant.

In another embodiment, a rotary-winged aircraft includes an airframe and a main rotor assembly operably connected to the airframe. The main rotor assembly includes a plurality of rotor blade assemblies rotatable about a rotor assembly axis. At least one rotor blade assembly of the plurality of rotor blade assemblies includes a rotor blade and a rotatable flap portion located along a span of the rotor blade. A linear actuator is positioned inside the rotor blade and is operably connected to the flap portion to rotate the flap portion about a flap axis. The linear actuator is absent of oil, grease or other fluid lubricant.

In yet another embodiment, an actuation system for a flap portion of a rotor blade includes a linear actuator located at the rotor blade and operably connected to the flap portion to rotate the flap portion about a flap axis. The linear actuator is absent of grease or oil or other fluid lubrication.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
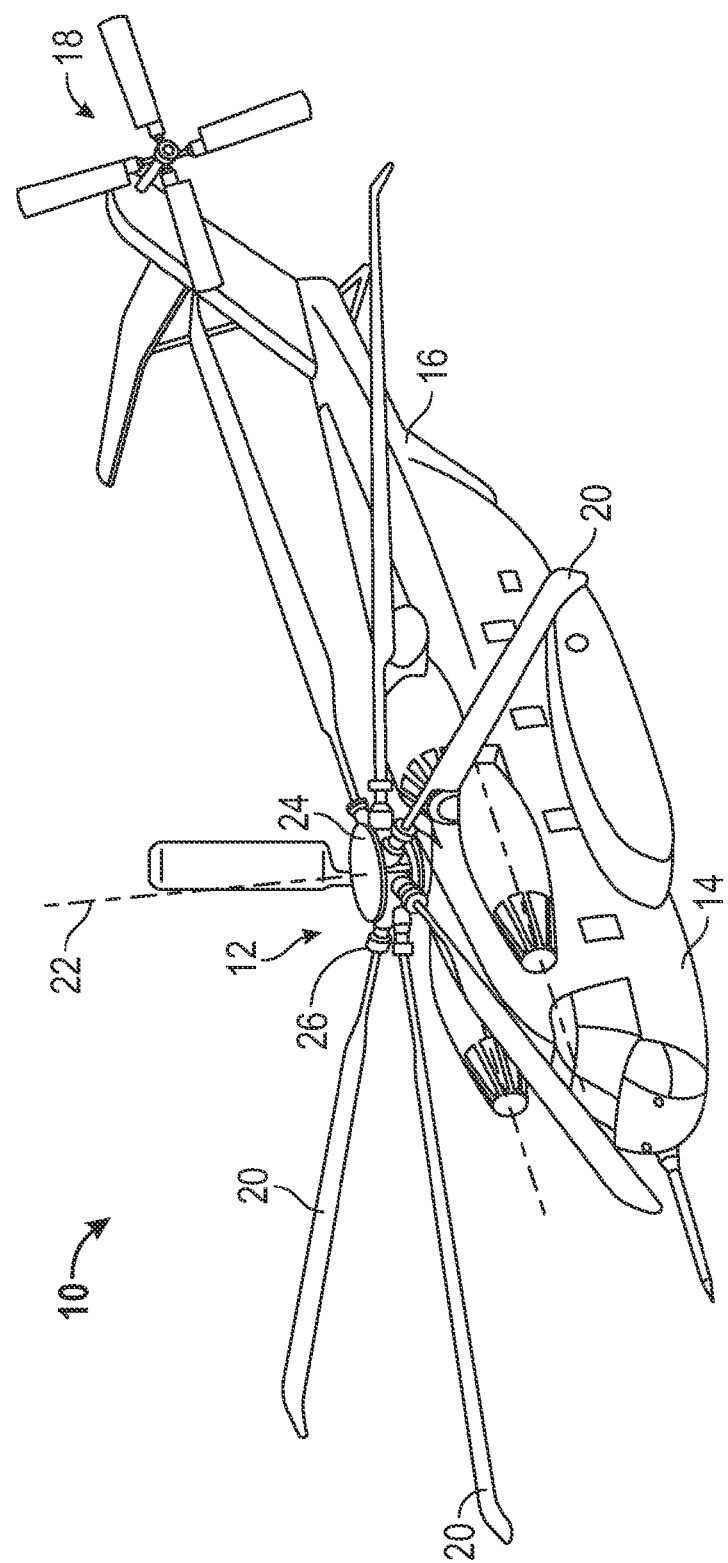
FIG. 1 is a schematic illustration of an embodiment of a rotary-winged aircraft.

Shown in FIG. 1 is a schematic of a rotary wing aircraft, in this embodiment, a helicopter 10. The helicopter 10 includes a main rotor assembly 12, and an airframe 14 having an extending tail 16 at which is mounted an anti-torque rotor 18. Although the aircraft illustrated is a helicopter 10, it is to be appreciated that other machines, such as turbo props or tilt-rotor aircraft or coaxial or tandem rotor helicopters or other structures such as wind turbine blades may also benefit from the system of the present disclosure. The main rotor assembly 12 includes a plurality of rotor blades 20 located about a rotor axis 22 via a rotor hub assembly 24. Further, it is to be appreciated that the rotor blade 20 configurations described herein may be applied to other rotor assemblies, such as those for wind turbines.

Figure 2:
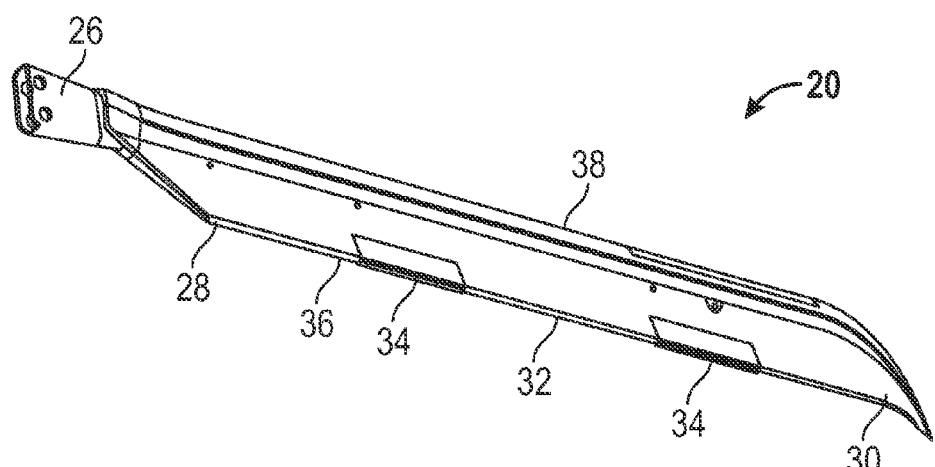
FIG. 2 is a schematic illustration of an embodiment of a rotor blade assembly for a rotary-winged aircraft.

Referring now to FIG. 2, each rotor blade 20 extends from a blade cuff 26, at which the rotor blade 20 is secured to the hub assembly 24 (best shown in FIG. 1). The rotor blade 20 includes a root section 28 nearest the blade cuff 26 and a tip section 30 at a most radially outboard portion of the rotor blade 20. A midspan section 32 is located between the root section 28 and the tip section 30. Each rotor blade 20 section may be further defined by particular airfoil shapes or geometries to result in desired aerodynamic properties and performance of each section, and the rotor blade 20 as a whole. The rotor blade 20 includes one or more flaps 34 located at a trailing edge 36 of the rotor blade 20 in one or more of the root section 28, tip section 30 or midspan section 32. Even though flaps 34 located at the trailing edge 36 are described and illustrated herein, it is to be appreciated that rotor blades 20 including flaps 34 located at a leading edge 38 of the rotor blade 20 would also benefit from the present disclosure.

Figure 3:
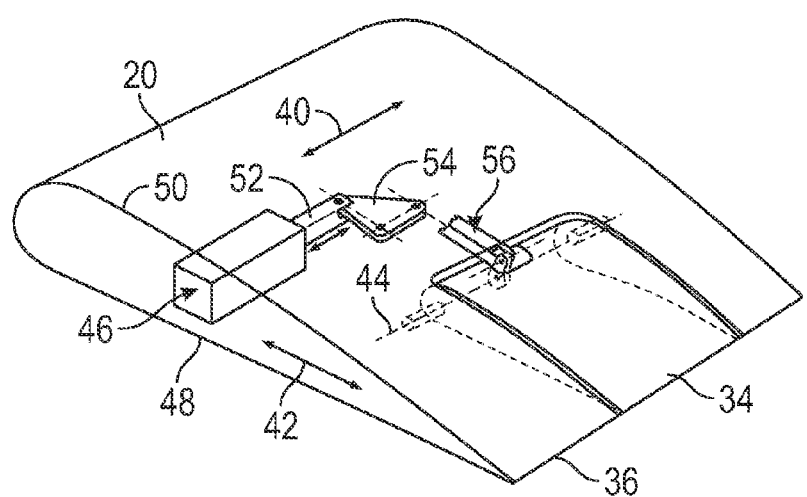
FIG. 3 is a schematic illustration of an embodiment of a flap and actuator arrangement of rotor blade assembly for a rotary-winged aircraft.
Figure 4:
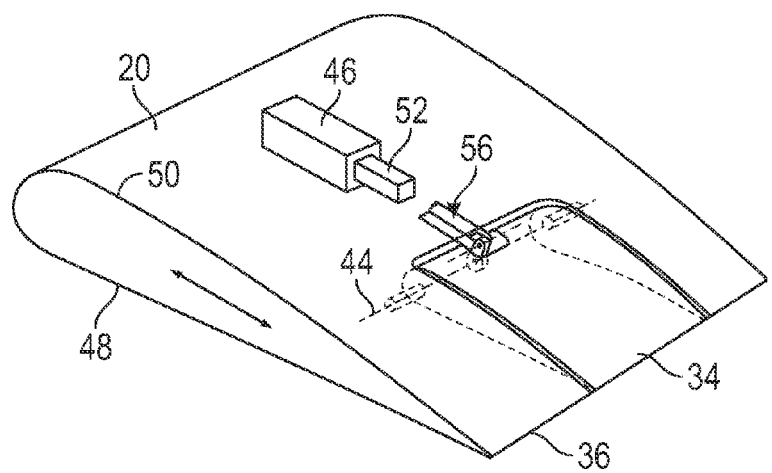
FIG. 4 is a schematic illustration of another embodiment of a flap and actuator arrangement of a rotor blade assembly for a rotary-winged aircraft.

In FIG. 3, an embodiment of a flap 34 located at the trailing edge 36 is illustrated. The flap 34 extends at least partially along the trailing edge in a spanwise direction 40, and partially into the rotor blade 20 along a chordwise direction 42. The flap 34 is rotated about a flap axis 44, substantially parallel to the spanwise direction 40, to change aerodynamic properties and performance of the rotor blade 20. A linear actuator 46 is located between a pressure side 48 and a suction side 50 of the rotor blade 20 and is operably connected to the flap 34. In the embodiment illustrated, the linear actuator 46 is oriented such that an output piston 52 of the linear actuator 46 extends in the spanwise direction 40. In this embodiment, the output piston 52 is connected to the flap 34 via a bell crank 54 and a linkage 56 to convert the linear motion of the output piston 52 into rotary motion of the flap 34 about the flap axis 44. In an alternative embodiment, shown in FIG. 4, the linear actuator 46 is oriented such that the output piston 52 extends in the chordwise direction 42. This embodiment eliminates the need for the bell crank 54. Use of the linear actuator 46 allows for high frequency, precise movement of the flap 34, in some embodiments in the range of about 1-5 cycles per single rotation of the main rotor assembly 12.

Figure 5:
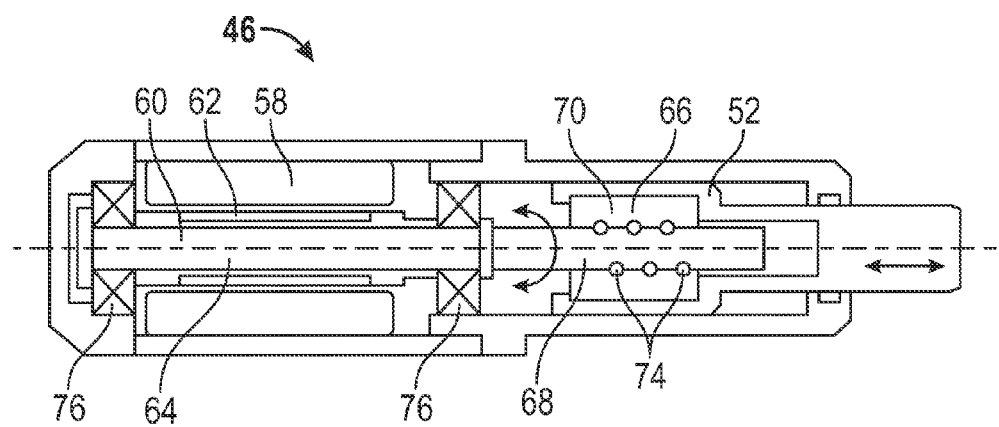
FIG. 5 is a cross-sectional view of an embodiment of an actuator for a flap of a rotor blade assembly for a rotary-winged aircraft The detailed description explains embodiments of the invention, together with advantages and features, by way of example with reference to the drawing.

Referring to FIG. 5, the linear actuator 46 includes a DC brushless motor 58 that drives rotation of a motor shaft 60. In some embodiments, the motor 58 utilizes neodymium magnets 62 in a rotor 64 to allow high continuous and peak torque ratings, and high reliability in harsh operating environments. The motor shaft 60 is connected to a planetary roller screw 66 to transform rotary motion of the motor shaft 60 into linear motion of the output piston 52. The roller screw 66 includes a screw shaft 68 connected to the motor shaft 60 and a roller nut 70 located between the screw shaft 68 and the output piston 52. Rotary motion of the screw shaft 68, via the motor shaft 60, moves the roller nut 70 in an axial direction 72 along the screw shaft 68 thus driving motion of the output piston 52 in the axial direction 70. The load bearing elements of the roller screw 66 are threaded roller elements 74 between the screw shaft 68 and the roller nut 70. The rolling elements 74 provide a high number of contact points with the roller nut 70 and allow the roller screw 66 to support heavy loads. To reduce wear of the roller screw 66 components, the rolling elements 74 and the roller nut 70 are dry lubricant coated prior to installation. One or more of the rolling elements 74 may be further constructed from a self lubricating material and used only for lubrication purposes, not for load carrying.

The motor shaft 60 and screw shaft 68 are supported and located by a thrust bearing 76, which is a dual row angular contact bearing. The thrust bearing 76 is utilized to carry axial loads from the screw shaft 68, and is preloaded to limit axial play and axial deflection under loaded conditions. The bearing elements of the thrust bearing 76 are constructed using ceramic or steel rolling elements, such as balls, and separators impregnated with solid lubricant, thus eliminating a need for oil or grease lubricant internal to the linear actuator 46 for lubrication of the thrust bearing 76 and the rolling elements 74. The moving or sliding components of the linear actuator 46 may be self lubricating, provided with dry lubrication surface finishes or coatings, formed from materials such as ceramics, or formed utilizing diamond like coating (DLC) technology in conjunction with a dry lubricant coating or grease plating process. Alternatively, the linear actuator 46 may be lubricated with nanoparticle based lubricants, fine-grained dry materials, which are prevented from migration from critical areas under high centrifugal loading by suitable baffles and/or separators.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A rotor blade assembly comprising:
   a rotor blade;
   a rotatable flap portion disposed along a span of the rotor blade; and
   a linear actuator disposed inside the rotor blade operably connected to the flap portion to rotate the flap portion about a flap axis, the linear actuator is absent from oil, grease or other fluid lubricant, the linear actuator including:
   a brushless DC motor;
   a screw shaft operably connected to the motor;
   an output piston operably connected to the screw shaft via a roller nut to transform rotary motion of the screw shaft into linear motion on the output piston; and
   a plurality of rolling elements disposed between the screw shaft and the roller nut.

2. The rotor blade assembly of claim 1, wherein the flap portion is disposed at a trailing edge of the rotor blade assembly.

3. The rotor blade assembly of claim 1, wherein the linear actuator is lubricated via one or more of dry lubrication surface finishes or coatings or nanoparticle bases lubricants.

4. The rotor blade assembly of claim 1, wherein an output piston of the linear actuator extends in a chordwise direction.

5. The rotor blade assembly of claim 1, wherein the rolling elements are formed from a self-lubricating material.

6. The rotor blade assembly of claim 1, wherein one or more of the plurality of rolling elements, the roller nut and the screw shaft are dry lubricant coated.

7. The rotor blade assembly of claim 1, further comprising a thrust bearing to support and located the screw shaft, the thrust bearing including one or more separators formed from a self lubricating material.

8. A rotary-winged aircraft comprising:
   an airframe; and
   a main rotor assembly operably connected to the airframe including a plurality of rotor blade assemblies rotatable about a rotor assembly axis, at least one rotor blade assembly of the plurality of rotor blade assemblies including:
   a rotor blade;
   a rotatable flap portion disposed along a span of the rotor blade; and
   a linear actuator disposed inside the rotor blade operably connected to the flap portion to rotate the flap portion about a flap axis, the linear actuator is absent from oil, grease or other fluid lubricant, the linear actuator including:
   a brushless DC motor;
   a screw shaft operably connected to the motor;
   an output piston operably connected to the screw shaft via a roller nut to transform rotary motion of the screw shaft into linear motion on the output piston; and
   a plurality of rolling elements disposed between the screw shaft and the roller nut;
   wherein one or more of the plurality of rolling elements, the roller nut and the screw shaft are dry lubricant coated.

9. The rotary-winged aircraft of claim 8, wherein the linear actuator is lubricated via one or more of dry lubrication surface finishes or coatings or nanoparticle bases lubricants.

10. The rotary-winged aircraft of claim 8, wherein the rolling elements are formed from a self-lubricating material.

11. The rotary-winged aircraft of claim 8, further comprising a thrust bearing to support and located the screw shaft, the thrust bearing including one or more separators formed from a self lubricating material.

12. The rotary-winged aircraft of claim 8, wherein the linear actuator is configured to cycles the flap portion about the flap axis at a rate in the range of about 1-5 cycles per revolution of the rotor blade assembly about the rotor assembly axis.

13. An actuation system for a flap portion of a rotor blade comprising a linear actuator disposed at the rotor blade and operably connected to the flap portion to rotate the flap portion about a flap axis, the linear actuator absent from grease or oil for lubrication, the linear actuator including:
  a brushless DC motor;
  a screw shaft operably connected to the motor;
  an output piston operably connected to the screw shaft via a roller nut to transform rotary motion of the screw shaft into linear motion on the output piston; and
  a plurality of rolling elements disposed between the screw shaft and the roller nut;
  wherein one or more of the plurality of rolling elements, the roller nut and the screw shaft are dry lubricant coated.

* * * * *